Patented July 12, 1949

2,476,082

UNITED STATES PATENT OFFICE 2,476,082

PROLONGED-ACTION PREPARATIONS OF D-TUBOCURARINE SALTS AND METHODS OF PREPARING SAME

John C. Burke, Milltown, N. J., and Alfred E. Jurist, Brooklyn, N. Y., assignors to E. R. Squibb & Sons, New York, N. Y., a corporation of New York No Drawing. Application October 1, 1946, Serial No. 700,370

7 Claims. (Cl. 167—67)

This invention relates to preparations of drugs having a relaxing effect on the voluntary musculature, especially to preparations of d-tubocurarine chloride (the highly active alkaloid isolated from curare).

Curare is a plant extract characterized by its relaxing effect on the voluntary musculature; and both the stable, physiologically-standardized preparations of curare (cf. U. S. Patent No. 2,397,417 dated March 26, 1946) and the d-tubocurarine chloride isolated from curare have been shown to have exceptional utility in the treatment of spastic paralysis; in combination with anesthesia during surgical operations; as an adjunct to the shock therapy of certain mental conditions; and for other medical purposes.

In the treatment of spastic children, the curare preparation or d-tubocurarine chloride was injected intravenously to produce a relaxation of the voluntary musculature, reducing incoordination, athetosis, and dysarthria, and permitting physical therapy under favorable conditions (muscle training, under such relaxation, constituting a very important part of the treatment). This relaxation of the voluntary musculature, however, was transient; and although some prolongation of the relaxing effect was obtained on intramuscular-injection of the drug (in aqueous solution), the danger of too rapid or variable absorption of the injected drug was introduced, and the prolongation obtained was not to the desired extent. Because of the low margin of safety of these drugs (the range of dosage between that giving the desired skeletal-muscle effect and that giving the undesirable toxic paralysis of the muscles of respiration), the prospects of obtaining a preparation capable of safely producing a prolonged relaxation of the voluntary musculature were not too bright.

It is the object of this invention to provide preparations capable of safely producing a prolonged relaxation of the voluntary musculature, and methods of obtaining such preparations.

It has been found that suspension of d-tubocurarine chloride, for example, in an oily medium suitable for intramuscular-injection and containing myricin, for example, results in a preparation capable (on intramuscular-injection) of safely producing a prolonged relaxation of the voluntary musculature. It has been further found that subdivision of d-tubocurarine chloride sufficient to give a uniform suspension can be efficiently and satisfactorily accomplished by lyophilizing or freeze-drying an aqueous solution thereof (i. e., by freezing the solution and subjecting the solid to a high vacuum to sublime off the water).

While providing a satisfactory suspension, the lyophilized d-tubocurarine chloride has a tendency to settle out and agglutinate on warming the suspension to ampule it or to transfer it to a syringe, and resuspension is difficult to effect and introduces the dangerous possibility of irregular dosage. It has been found that this tendency to settle out or agglutinate may be substantially eliminated by including in the aqueous solution of d-tubocurarine chloride to be lyophilized a water-soluble alkaline-earth-metal salt of a physiologically-acceptable organic acid, especially of a physiologically-acceptable hydroxy-aliphatic acid. The dry product thus obtained is in a fine state of subdivision; and when suspended, the particles thereof have little or no tendency to settle out or agglutinate. Moreover the suspension obtained has such stability that it can be heat-sterilized, as well as heated for the purposes of subdividing multiple-dose packages, and transferring to a syringe.

The preparations of this invention essentially comprise d-tubocurarine chloride or equivalent thereof (i. e., a curarizing drug, or drug having qualitatively the same relaxing effect on the voluntary musculature as curare) in an oily medium suitable for intramuscular injection and containing myricin or equivalent thereof (i. e., a physiologically-acceptable, wax-like substance, or an agent capable of delaying the absorption of water-soluble particles suspended in an oily medium). Thus, in place of (the preferred) d-tubocurarine chloride, one may employ other water-soluble salts of the corresponding quaternary base d-tubocurarine (inter alia, d-tubocurarine sulfate and d-tubocurarine iodide), as well as derivatives of the quaternary base having qualitatively the same relaxing effect on the voluntary musculature, inter alia, d-chondocurine dimethiodide, and d-tubocurarine dimethylether iodide. Thus also, in place of (the preferred) myricin (the primary component of beeswax), one may employ beeswax itself, other (true) waxes (natural or synthetic), other wax-like components of the natural waxes, synthetic wax-like homologues of these wax-like components, and mixtures thereof (inter alia, beeswax, cerotic acid, spermaceti, cetyl palmitate, carnauba wax, myricyl alcohol, and myricyl cerotate).

The water-soluble alkaline-earth-metal salts of physiologically-acceptable hydroxy-aliphatic acids preferred for the purposes of this invention are the calcium salts of the sugar-derived acids, notably calcium lactate. The proportion of d-tubocuraine chloride to calcium lactate, for example, may vary within rather wide limits, say about 1:.05 to about 1:4 (by weight); but a proportion of about 1:1 is preferred. The concentration of the aqueous solution to be dried may vary from about 0.6 to about 3.0 g. of d-tubocurarine chloride per 100 ml., concentrations above 1.5 g./100 ml. being obtained by including 10% of ethanol in the aqueous solution.

The following examples are illustrative of the invention:

Example 1

700 mg. of d-tubocurarine chloride (having a potency of 6.17 Holaday units/mg.) and a quantity of hydrated calcium lactate equivalent to 2.4 g. of the anhydrous salt are dissolved in 100 ml. distilled water, and the solution is freeze-dried. 1.1 g. of the dry product thus obtained is suspended in 3.55 g. of peanut oil containing 6% myricin, by warming to 65° C. and triturating. Then, while the suspension is warm, it is subdivided into measured doses and ampuled, and the ampuled preparation is sterilized by heating to 120° C. for three hours. The product thus obtained is an (ampuled) stable suspension capable on intramuscular-injection of safely producing a prolonged relaxation of the voluntary musculature.

Example 2

600 mg. of d-tubocurarine chloride (cf. Example 1) and 600 mg. of calcium lactate (on an anhydrous basis) are dissolved in 100 ml. distilled water, and the solution is freeze-dried. Following the procedure described in Example 1, the dry product thus obtained (weighing 955 mg.) is suspended in a mixture of 19.3 ml. peanut oil and 1.0 g. myricin and the suspension is ampuled and sterilized.

The calcium lactate employed in either of the foregoing examples may be replaced by the same amount of calcium gluconate (on an anhydrous basis) to obtain a preparation having substantially the same stability.

A stable suspension capable on intramuscular-injection of producing a prolonged relaxation of the voluntary musculature is also obtained when the 1.0 g. myricin in Example 2 is replaced by 1.35 g. beeswax or by 1.0 g. cerotic acid; or when the peanut oil in any of the suspensions described hereinbefore is replaced by sesame oil.

The presence of a small amount of moisture in the preparations of this invention disproportionately increases the rate of absorption; thus, the presence of as little as about .07% moisture may result in over-curarization. Accordingly, care should be taken to have the ingredients of these preparations substantially dry, and to substantially exclude moisture during preparation, packaging (ampuling), and steam-sterilization (as by use of a seal resistant to the passage of steam during autoclaving).

The peanut oil or sesame oil employed in the foregoing examples may be replaced by other oils or mixtures of oils suitable for intramuscular-injection, or by oily media suitable for intramuscular-injection, such as mixtures of oils with such physiologically-acceptable substances as cetyl alcohol. The proportion of myricin, for example, in the oily medium may vary widely, proportions as low as about 3%, for example, being satisfactory for the purposes of this invention. Also, the proportion of the d-tubocurarine chloride (or preparation thereof) suspended in the oily medium may vary widely, proportions as low as about 2%, for example, or proportions yielding a preparation having a potency of about 100 Holaday units/ml., for example, being satisfactory for the purposes of this invention.

The invention may be variously otherwise embodied within the scope of the appended claims.

We claim:

1. A preparation capable on intramuscular-injection of safely producing a prolonged relaxation of the voluntary musculature, essentially comprising a suspension of the solid obtained on lyophilizing an aqueous solution of a water-soluble salt of d-tubocurarine containing a water-soluble alkaline-earth-metal salt of a member of the group consisting of lactic acid and gluconic acid, in an oily medium suitable for intramuscular-injection and containing a physiologically-acceptable wax-like substance, the preparation having a moisture content below about 0.07%.

2. A preparation capable on intramuscular-injection of safely producing a prolonged relaxation of the voluntary musculature, essentially comprising a suspension of the solid obtained on lyophilizing an aqueous solution of d-tubocurarine chloride containing a water-soluble alkaline-earth-metal salt of a member of the group consisting of lactic acid and gluconic acid, in an oily medium suitable for intramuscular-injection and containing myricin, the preparation having a moisture content below about 0.07%.

3. A preparation capable on intramuscular-injection of safely producing a prolonged relaxation of the voluntary musculature, essentially comprising a suspension of the solid obtained on lyophilizing an aqueous solution of d-tubocurarine chloride containing calcium lactate, in an oily medium suitable for intramuscular-injection and containing myricin, the preparation having a moisture content below about 0.07%.

4. A preparation capable on intramuscular-injection of safely producing a prolonged relaxation of the voluntary musculature, essentially comprising a suspension of the solid obtained on lyophilizing an aqueous solution of d-tubocurarine chloride containing calcium lactate, in an oily medium suitable for intramuscular-injection and containing myricin, the proportion of d-tubocurarine chloride to calcium lactate being between about 1:.05 and about 1:4 and the preparation having a moisture content below about 0.07%.

5. The composition obtained by lyophilizing an aqueous solution of d-tubocurarine chloride containing a water-soluble alkaline-earth-metal salt of a member of the group consisting of lactic acid and gluconic acid.

6. The method of obtaining a preparation capable on intramuscular-injection of safely providing a prolonged relaxation of the voluntary musculature, comprising lyophilizing an aqueous solution of a water-soluble salt of d-tubocurarine containing a water-soluble alkaline-earth-metal salt of a member of the group consisting of lactic acid and gluconic acid, and suspending the dry product thus obtained in a substantially dry oily medium suitable for intramuscular-injection and containing a physiologically-acceptable wax-like substance.

7. The method of obtaining a preparation capable on intramuscular-injection of safely producing a prolonged relaxation of the voluntary musculature, comprising lyophilizing an aqueous solution of d-tubocurarine chloride containing calcium lactate, and suspending the dry product thus obtained in a substantially dry oily medium suitable for intramuscular-injection and containing myricin.

JOHN C. BURKE.
ALFRED E. JURIST.

REFERENCES CITED

The following references are of record in the file of this patent:

UNITED STATES PATENTS

| Number | Name | Date |
|---|---|---|
| Re. 18,364 | Tival | Feb. 27, 1932 |
| 1,791,878 | Strauck | Feb. 10, 1931 |
| 2,055,083 | Klein et al. | Sept. 22, 1936 |
| 2,149,304 | Masucci | Mar. 7, 1939 |
| 2,397,417 | Holaday | Mar. 26, 1946 |

OTHER REFERENCES

Code et al., Proceedings of the Society for Experimental Niology and Medicine, June 1940, pages 475–477.

Code et al., American J. Physiology, June 1941, pages 240–241. (Copies in Division 43.)